UNITED STATES PATENT OFFICE 2,695,904
Patented Nov. 30, 1954

2,695,904

N-PHENETHYL 2-ARYLTHIAZOLE SULFENAMIDES

Robert H. Cooper, Nitro, W. Va., and Albert J. Greene, St. Louis, Mo., assignors to Monsanto Chemical Company, St. Louis, Mo., a corporation of Delaware No Drawing. Application July 31, 1952,
Serial No. 301,968

9 Claims. (Cl. 260—306.6)

This invention relates to new sulfenamides and more particularly to N-phenethyl 2-arylthiazole sulfenamides.

The new compounds possess fungicidal properties and accelerate the vulcanization of rubber. Their accelerating properties are outstanding. They may be regarded as derivatives of the parent benzothiazole sulfenamide of the structure

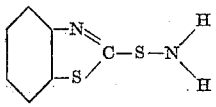

This compound is a strong accelerator having considerable delayed action but is too unstable for commercial use. Many derivatives have been prepared in an attempt to find satisfactory delayed action accelerators. Replacing one of the hydrogen atoms by a methyl or other lower alkyl group lowers the processing safety. Furthermore replacement of one of the hydrogens in the methyl group by a phenyl group or in other words substituting one of the sulfenamide hydrogen atoms by a benzyl group also lowers the processing safety. It has now been discovered that replacing a hydrogen in the above formula by a β-phenethyl group imparts outstanding delayed action combined with powerful accelerating activity above the critical temperature. Replacement by an α-phenethyl group results in marked delayed action and strong accelerating properties although in both respects the properties are somewhat inferior. Replacing both hydrogens by a phenethyl group results in a compound having accelerating activity but neither accelerating strength nor delayed action are outstanding. However, in every case the presence of a phenethyl group was found to enhance the stabiltiy of the molecule.

The new compounds possess the general formula

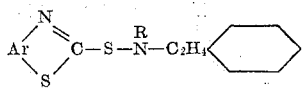

where Ar represents an ortho arylene group and R is either hydrogen or phenethyl. They may be prepared by the condensation of a 2-mercapto arylene thiazole and phenethylamine or diphenethylamine in the presence of an oxidizing agent, as for example chlorine, hypochlorite, hydrogen peroxide and ammonium persulfate or by reacting the N-halogen phenethylamine with the mercapto aryl thiazole.

The following examples illustrate the invention.

*Example 1*

Into a suitable glass or glass-lined reactor there was charged 37.8 grams (0.3125 molecular proportion) of mono β-phenethylamine. The amine was cooled to —10° C. and thereupon was added 87 cc. (0.25 molecular proportion) of sodium hypochlorite solution containing 21.4 grams of sodium hypochlorite per 100 cc. The hypochlorite was added over a period of about 70 minutes while keeping the temperature of the reaction mixture at —10 to —5° C. While the reaction mixture was still kept within the range of —10 to —5° C., there was gradually added 103.5 grams (0.25 molecular proportion) of a 40.4% aqueous solution of sodium mercaptobenzothiazole. This solution was added over a period of about 50 minutes and the reaction mixture was stirred for an additional 150 minutes while being kept cold throughout. The reaction mixture was then treated with ether, the water layer separated and the organic layer washed with water until neutral. The organic layer was then dried over anhydrous sodium sulfate and the solvent removed by distillation at reduced pressure. The residue comprising the desired N-β-phenethyl 2-benzothiazole sulfenamide was an oil. It contained 9.6% nitrogen as compared with the calculated value of 9.8%. The yield was 84% of the theoretical.

*Example 2*

A suspension of mercaptobenzothiazole was prepared by adding 41.5 cc. of 25% sulfuric acid to 312.5 grams (0.25 molecular proportion) of a 13.36% aqueous solution of sodium mercaptobenzothiazole. There was then added 33.5 grams (0.275 molecular proportion) of β-phenethylamine. The reaction mixture was stirred vigorously and kept at 34–37° C. while 156 cc. (0.315 molecular proportion) of sodium hypochlorite solution containing 15.05 grams of sodium hypochlorite per 100 cc. was added over a period of about 105 minutes. This quantity of hypochlorite solution gave a positive end point with starch potassium iodide paper which persisted for 10 minutes. The excess hypochlorite was then destroyed by the addition of 1 gram of sodium sulfite. The reaction mixture was extracted with ether and the extracts filtered from a small amount of insoluble impurity and washed repeatedly until the washings were neutral. The solvent was removed by evaporation at room temperature. This procedure gave a 93.8% yield of N-β-phenethyl 2-benzothiazole sulfenamide as a residue after removal of the solvent. The heavy oil product contained 9.8% nitrogen which is the same as the calculated value.

*Example 3*

Into a suitable glass or glass-lined reactor there was charged 43.5 grams (0.36 molecular proportion) of α-phenethylamine. The reactor and contents were chilled to about 0° C. and 117 cc. (0.32 molecular proportion) of aqueous sodium hypochlorite containing 20.48 grams of sodium hypochlorite per 100 cc. added gradually to the cold amine. The temperature of the reaction mixture was kept in the range of 0 to —5° C. throughout the addition. The temperature was still kept in this range while 127.5 grams (0.30 molecular proportion) of 39.25% aqueous sodium mercaptobenzothiazole was gradually added over a period of about 75 minutes. The reaction mixture was stirred for an additional 45 minutes, keeping the temperature below 10° C. and the mass extracted with ether and the ether extract washed until neutral and dried over anhydrous sodium sulfate. The solvent was removed and the oily residue separated from a small quantity of solid impurity. The product was a heavy oil which congealed to a soft solid on standing. The yield of N-α-phenethyl 2-benzothiazole sulfenamide was 75.4% of the theoretical.

*Example 4*

Into a glass or glass-lined reactor of suitable capacity was charged 56.5 grams (0.25 molecular proportion) of di-β-phenethylamine. The reactor and contents were cooled to 10° C. and 87 cc. (0.25 molecular proportion) of sodium hypochlorite solution containing 21.4 grams of sodium hypochlorite per 100 cc. was gradually added. The hypochlorite was added over a period of about 90 minutes while the temperature of the reaction was kept within the range of 10 to 18° C. There was then added 103.5 grams (0.25 molecular proportion) of a 40.4% aqueous solution of sodium mercaptobenzothiazole. The latter was added over a period of about 45 minutes while keeping the temperature of the reaction mixture within the range of 14 to 19° C. The heavy oily product was dissolved in ether, a small quantity of solid impurity separated by filtration, and the ether extract washed with water until neutral and dried over anhydrous sodium sulfate. The residue remaining after removal of the solvent comprised two products. It was found that the desired di-N-β-phenethyl 2-benzothiazole sulfenamide was the portion insoluble in petroleum ether. Accordingly the residue was extracted with petroleum ether and the desired product obtained as a residue from this treatment. Analysis gave 7.1% nitrogen as compared to the calculated value of 7.2%.

As illustrative of the accelerating properties of the new compounds, vulcanizable compositions were compounded comprising

| Stock | A | B | C |
|---|---|---|---|
| Smoked sheets_____parts by weight__ | 100 | 100 | 100 |
| Zinc oxide_____do____ | 5 | 5 | 5 |
| Sulfur_____do____ | 3 | 3 | 3 |
| Stearic acid_____do____ | 1 | 1 | 1 |
| N-β-Phenethyl 2-benzothiazole sulfenamide___do____ | 1 | | |
| N-α-Phenethyl 2-benzothiazole sulfenamide___do____ | | 1 | |
| N - Di - β - phenethyl 2 - benzothiazole sulfenamide_____parts by weight__ | | | 1 |

The stocks so compounded were vulcanized in the usual manner by heating in a press for different periods of time at 126° C. The physical properties are set forth below:

TABLE I

| Stock | Cure Time in Mins. | Modulus of Elasticity in lbs./in.² at Elongations of— | | Tensile at Break in lbs./in.² | Ult. Elong., percent |
|---|---|---|---|---|---|
| | | 300% | 500% | | |
| A | 60 | 230 | 805 | 3,805 | 765 |
| B | 60 | 325 | 1,115 | 3,810 | 685 |
| C | 60 | 50 | 100 | 1,260 | 970 |
| A | 90 | 446 | 1,533 | 3,950 | 660 |
| B | 90 | 363 | 1,200 | 3,926 | 686 |
| C | 90 | 360 | 1,335 | 4,155 | 700 |

In addition the processing safety of the uncured compositions was evaluated by means of a Mooney plastometer. The time required for incipient vulcanization or scorch was taken at the point on the plasticity curve when the plasticity began to rise continuously.

TABLE II

| Stock | Mooney Scorch in Mins. at 135° C. |
|---|---|
| A | 25 |
| B | 22 |
| C | 12 |

It is intended to cover all changes and modifications of the examples of the invention herein chosen for purposes of disclosure which do not constitute departures from the spirit and scope of the invention.

What is claimed is:
1. A compound of the structure

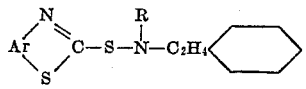

where R is selected from the group consisting of hydrogen and

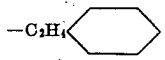

groups and Ar represents an ortho phenylene group.

2. A compound of the structure

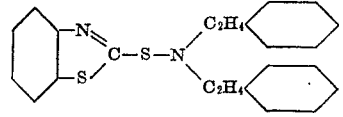

3. A compound of the structure

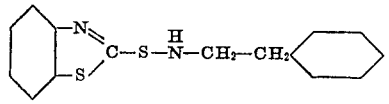

4. The method of making new sulfenamides which comprises condensing an amine selected from the group consisting of β-phenethylamine and di-β-phenethylamine with a mercaptan of the structure

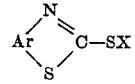

where Ar represents an ortho phenylene group and X is selected from the group consisting of hydrogen and alkali metal in the presence of an oxidizing agent.

5. The method of making N-β-phenethyl 2-benzothiazole sulfenamide which comprises condensing 2-mercaptobenzothiazole with mono-β-phenethylamine in the presence of an oxidizing agent.

6. The method of making N-β-phenethyl 2-benzothiazole sulfenamide which comprises condensing 2-mercaptobenzothiazole with mono-β-phenethylamine in the presence of sodium hypochlorite.

7. The method of making N-β-phenethyl 2-benzothiazole sulfenamide which comprises condensing 2-mercaptobenzothiazole with N-chloro-β-phenethylamine.

8. The method of making N,N-di-β-phenethyl 2-benzothiazole sulfenamide which comprises condensing di-β-phenethylamine with 2-mercaptobenzothiazole in the presence of an oxidizing agent.

9. The method of making N,N-di-β-phenethyl 2-benzothiazole sulfenamide which comprises condensing N-chloro di-β-phenethylamine with sodium mercaptobenzothiazole.

References Cited in the file of this patent
UNITED STATES PATENTS

| Number | Name | Date |
|---|---|---|
| Re. 19,286 | Zaucker | Aug. 21, 1934 |
| 2,268,467 | Ashworth | Dec. 30, 1941 |
| 2,415,029 | Smith | Jan. 28, 1947 |
| 2,417,989 | Moore | Mar. 25, 1947 |